Sept. 23, 1952          S. L. MILLER         2,611,461
HITCH, INCLUDING MANUALLY OPERATED
SLIDING LATCH MECHANISM
Filed March 27, 1950                          2 SHEETS—SHEET 1
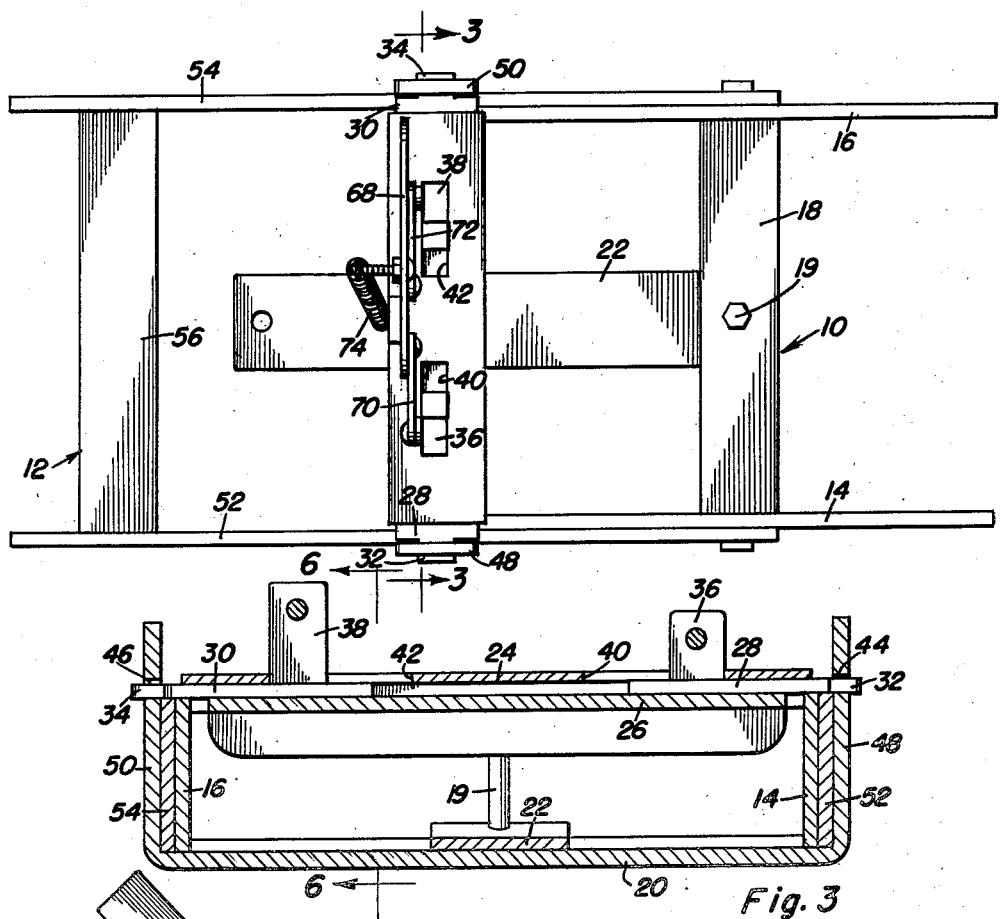
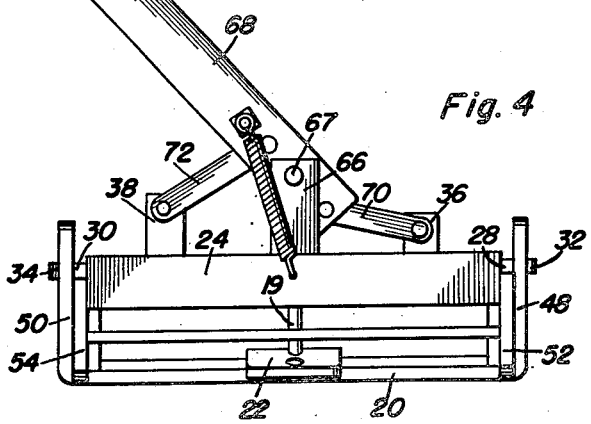
S. Linn Miller
INVENTOR.

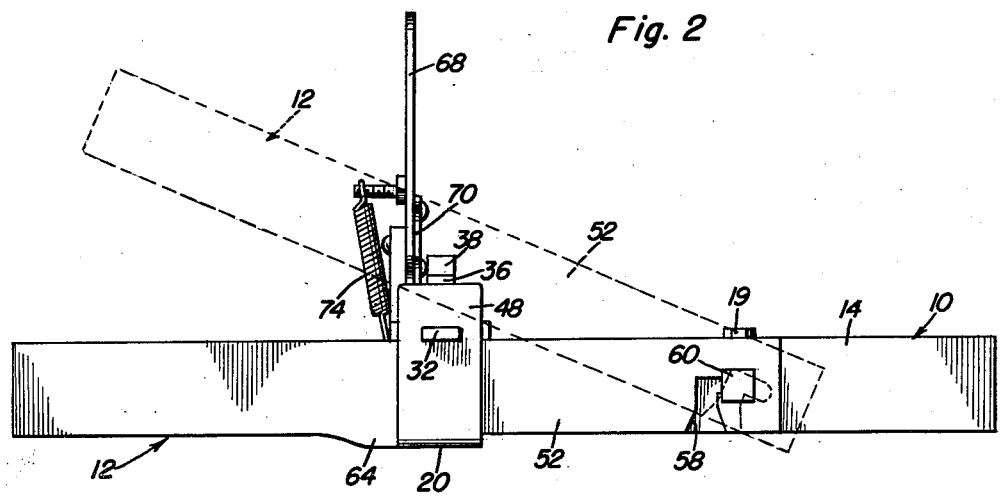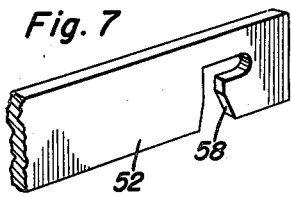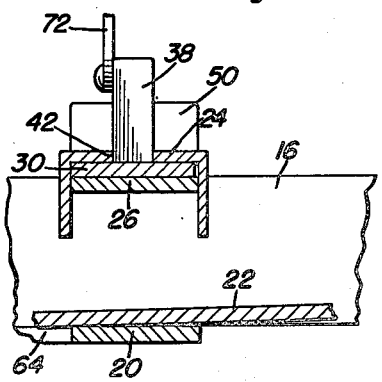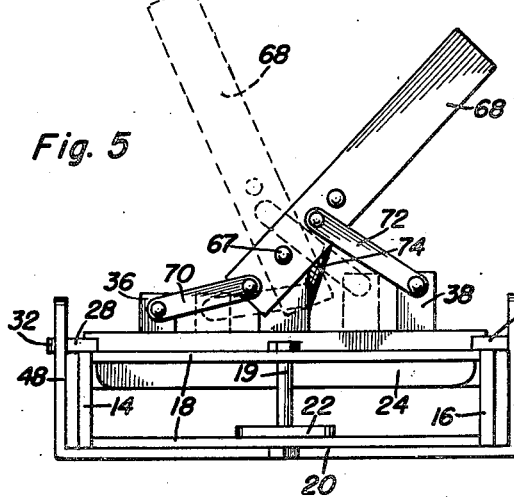

Patented Sept. 23, 1952

2,611,461

UNITED STATES PATENT OFFICE 2,611,461

HITCH, INCLUDING MANUALLY OPERATED SLIDING LATCH MECHANISM

S Linn Miller, Poplar Bluff, Mo.

Application March 27, 1950, Serial No. 152,224

5 Claims. (Cl. 189—36)

This invention relates to new and useful improvements in hitches and the primary object of the present invention is to provide a hitch including a pair of pivotally and detachably connected coupling members and a manually actuated latch mechanism for locking the members together and against relative movement.

Another important object of the present invention is to provide a hitch composed of a pair of slidable latch members and a single lever connocced to both of the latch members for simultaneously moving both latch members to a locked position and thereby permitting the hitch to be employed for quickly and readily coupling or uncoupling two vehicles or for connecting an agricultural implement to a tractor in a convenient manner.

A further object of the present invention is to provide a hitch including a pair of complemental coupling members and a spring urged locking mechanism that will yieldingly urge the coupling members into coupled engagement.

A still further aim of the present invention is to provide a hitch that is extremely strong and reliable in use, efficient and durable in operation, inexpensive to manufacture and install, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a plan view of the present invention showing the coupling members coupled;

Figure 2 is a side elevational view of Figure 1 and with dotted lines showing one of the coupling members lifted from the other of the coupling members;

Figure 3 is an enlarged transverse vertical sectional view taken substantially on the plane of section line 3—3 of Figure 1;

Figure 4 is an end view of Figure 1;

Figure 5 is an end view of Figure 1 opposite from Figure 4;

Figure 6 is a vertical sectional view taken substantially on the plane of section line 6—6 of Figure 3; and, Figure 7 is a fragmentary perspective view of one of the coupling members.

Referring now to the drawings in detail, wherein for the purpose of illustration, there is disclosed a preferred embodiment of the present invention, the numerals 10 and 12 represent a pair of coupling members or frame members that together form the present hitch or coupling.

The frame member 10 includes a pair of parallel arms 14 and 16 that are joined at one of their ends by parallel cross-straps 18. The other ends of the arms 14 and 16 are joined and strengthened by a U-shaped member or strap 20 whose web portion is suitably fixed by welding or the like to the lower edges of the arms 14 and 16. The cross-straps 18 are pivoted, as at 19, to one end of a draw bar or tongue 22 that overlies the U-shaped member 20.

A channel member 24 extends between and is terminally secured by welding or the like to the arms 14 and 16. A guide plate 26 is fixed within the channel member 24 and parallels the web portion of the channel member 24 as shown best in Figure 6 of the drawings.

A pair of latch members or locking members 28 and 30, having reduced outer end portions 32 and 34, are slidably received on the plate 26 and are disposed within the confines of the channel member 24 and the plate 26. Lugs or ears 36 and 38 project laterally from the latch members 28 and 30 and are slidably received in guide slots 40 and 42 provided in the web portion of the channel member 24.

The upper face of the plate 26 is flush with the upper edges of the arms 14 and 16 so that the latch members 28 and 30 may clear the arms 14 and 16 to enter openings 44 and 46 in the leg portions 48 and 50 of the U-shaped member. The leg portions 48 and 50 are spaced parallel to the arms 14 and 16 for a purpose which will later be more fully described.

The frame member 12 is composed of two parallel arms or straps 52 and 54 that are joined and reinforced by a cross-strap or bar 56. Bayonet slots 58 are provided in the lower edges of the arms 52 and 54 to receive bolts or pivots 60 and 62 projecting laterally from the arms 14 and 16 to permit swinging movement of the arms 52 and 54 about the pivots 60, 62 between the arms 14, 16 and the end portions 48, 50.

Abutments 64 are provided on the lower edges of the arms 52 and 54 for abutting the web portion of the U-shaped member 20 when the arms 52, 54 are received between the arms 14, 16 and the end portions 48, 50, as shown in Figure 2.

Means is provided for simultaneously moving the latch members into and out of the openings 44, 46 in the leg portions 48, 50. This means comprises an ear 66 rising from the member 24 to which there is pivoted, as at 67, a lever or handle 68. A lower pitman 70 is pivoted at one end to the lug 36 and at its other end to the lever 68 below the pivot 67. An upper pitman or link 72 is pivoted at one end to the lug 38 and at its other end to the lever 68 above the pivot 67, so that as the lever 68 is lowered toward the leg portion 50, the latch member 28 is pushed toward the leg portion 48 and the latch member 30 is pushed toward the leg portion 50.

When the reduced end portions 32 and 34 are positioned in the openings 44 and 46, the arms 52 and 54 are held against the web portion of the member 20 and can not pivot about the bolts 60 and 62. To yieldingly retain the lever 68 lowered toward the leg portion 50, there is provided a coil spring 74 that is terminally attached to the lever 68 and the member 24.

In practical use of the present invention, the frame members 10 and 12 are suitably attached to two structures or vehicles, such as a tractor and farm implement. The frame members may be disposed in a vertical position, horizontal position or an inclined position. The members 10 and 12 are quickly and readily assembled or disassembled by a manual actuation of the lever 68. After the arms 52 and 54 have been moved past the leg portions 48 and 50, the slots 56 will permit removal of the member 12 from the pivots 60.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A hitch comprising first and second coupling members, said first coupling member including a pair of side walls having openings therein, a guide member extending between said side walls, a pair of latch members slidably mounted on said guide member for movement into and out of said openings, said second coupling member including a pair of parallel arms received between said side walls and pivoted to said first coupling member, and means carried by said first coupling member and connected to both of said latch members for simultaneously moving the latch members into said openings to prevent pivotal movement of said arms.

2. A hitch comprising a first frame member including a pair of parallel inner arms, a second frame member including a pair of parallel outer arms, said outer arms being pivotally and removably secured to said inner arms, said first frame member also including a U-shaped strap fixed to said inner arms and having end portions paralleling the inner arms, said outer arms being received between said inner arms and said end portions and supported on said strap, a guide extending between and secured to said inner arms, a pair of latch members slidably carried by said guide and overlying said inner arms, said end portions having openings for receiving said latch members, and means on said first frame member and connected to said latch members for moving the latch members into the openings for locking the outer arms against pivotal movement.

3. A hitch comprising a first frame member including a pair of parallel inner arms, a second frame member including a pair of parallel outer arms, said outer arms being pivotally and removably secured to said inner arms, said first frame member also including a U-shaped strap fixed to said inner arms and having end portions paralleling the inner arms, said outer arms being received between said inner arms and said end portions and supported on said strap, a guide extending between and secured to said inner arms, a pair of latch members slidably carried by said guide and overlying said inner arms, said end portions having openings for receiving said latch members, ears projecting laterally from the latch members, a lug rising from the guide and located between said ears, upper and lower links pivoted to said ears, a lever pivoted to said lug, and pivots securing said links to said lever, said lever being lowered to simultaneously move the latch members into the openings.

4. A hitch comprising first and second members, said first member being pivoted and removably secured to said second member and means for locking the first member to the second member, said means comprising a pair of slides, a lug on the second member between the slides, a lever, a horizontal pivot securing the lever to the lug, a first pitman beneath the pivot and securing the lever to one of the slides, and a second pitman above the pivot and securing the lever to the other slide for simultaneous movement of said slides to their locked position upon lowering of the lever.

5. A hitch comprising a first pair of parallel arms, a U-shaped member joining said arms and including end portions spaced parallel to said arms, a second pair of parallel arms pivotally and removably secured to said first arms and movable against the U-shaped members and between said end portions and said first pair of arms, a guide extending between and fixed to said first pair of arms, a pair of latch members slidably mounted on said guides, said end portions having openings, said latch members overlying said first pair of arms, and means mounted on the guide and connected to both of said latch members for moving the latch members into the openings and the second pair of arms against the U-shaped member.

S LINN MILLER.

REFERENCES CITED

The following references are of record in the file of this patent:

UNITED STATES PATENTS

| Number | Name | Date |
|---|---|---|
| 717,752 | Koegel | Jan. 6, 1903 |
| 726,759 | Rhoads | Apr. 28, 1903 |